N. STOLL.
Billiard-Tables.
No. 5,779. Reissued March 3, 1874.
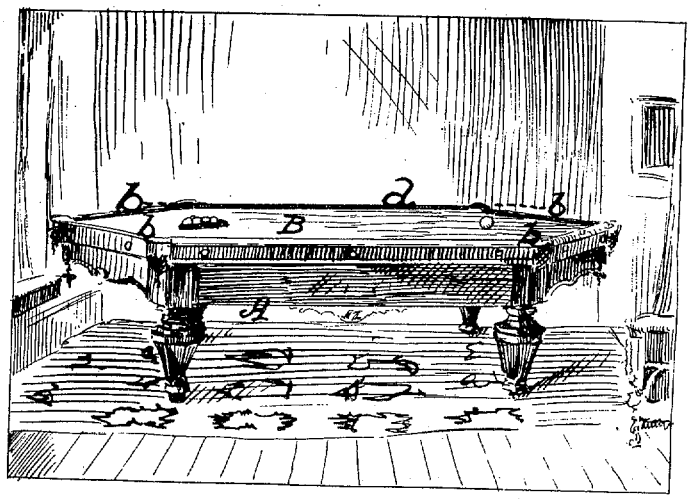
Witnesses:
J. W. Elliott
E. D. Chapin
Inventor:
Nikolaus Stoll
By G. A. Chapin,
Attorney.

UNITED STATES PATENT OFFICE.

NIKOLAUS STOLL, OF CHICAGO, ILLINOIS.

DESIGN FOR BILLIARD-TABLES.

Specification forming part of Design No. 6,550, dated April 1, 1873; reissue No. 5,779, dated March 3, 1874; application filed February 2, 1874.

*To all whom it may concern:*

Be it known that I, NIKOLAUS STOLL, of Chicago, in the county of Cook and State of Illinois, have invented a Design for a Billiard-Table, of which the following is a specification:

The accompanying photographic illustration fully represents the nature of my invention.

A represents the frame, and B the cloth-covered bed, of the table, which is faced on the inside of the rim *d* with cushions, in the usual manner.

The peculiar feature of my design consists in the shape of the table, the middle portion of the ends of which are extended outwardly from the frame A and beyond the angles *b b b b*, as shown.

I will here give the state of the art by saying that French billiard-tables, having six and eight sides, are old.

What I claim as my invention is—

The design for billiard-tables, having the configuration described and shown, and for the purpose set forth.

NIKOLAUS STOLL.

Witnesses:
J. H. ELLIOTT,
A. ZELLER.